Jan. 3, 1967     R. M. BISH ETAL     3,295,734

CARRYING BOARD

Filed June 22, 1964

Robert M. Bish
Jewell W. Davis
INVENTORS

BY

ATTORNEY

United States Patent Office 3,295,734
Patented Jan. 3, 1967

3,295,734
CARRYING BOARD
Robert M. Bish, 4420 Rusk, Houston, Tex. 77023, and Jewell W. Davis, Houston, Tex.; said Davis assignor to said Bish
Filed June 22, 1964, Ser. No. 376,723
1 Claim. (Cl. 224—48)

This invention relates to carrying boards, and more particularly it relates to devices for use in manual carrying of readily deformable articles such as loaves of bread wrapped in extremely flexible wrappings.

At the present time most bakeries wrap sliced bread in thin polyethylene wrappings which are so flexible that it is very difficult to handle the bread, particularly when it is relatively freshly baked, without crushing it. Personnel who must carry the bread manually from one place to the other such as the route salesmen who distribute bread to retail outlets, find it extremely difficult to carry the bread without crushing it to such an extent that it is objectionable in appearance to purchasers.

It is an object of this invention to provide a device which can be used to carry bread or other readily deformable articles without fear of crushing or otherwise deforming them during the carrying.

Another object of the invention is to provide apparatus which is readily handled by a person in the carrying of bread or other readily deformable articles.

These and other objects of the invention are accomplished, according to this invention, by the provision of a board adapted to be readily engaged by the hand and arm of the person who desires to carry the bread or other article and which is designed to support such articles without subjecting them to concentrated loading which causes crushing or deformation of such articles under their own weight or by the force required to hold them.

For a better understanding of the invention reference is now made to the following description and to the accompanying drawing wherein FIGURE 1 is an elevational view of a person using one embodiment of this invention;

Figure 1:
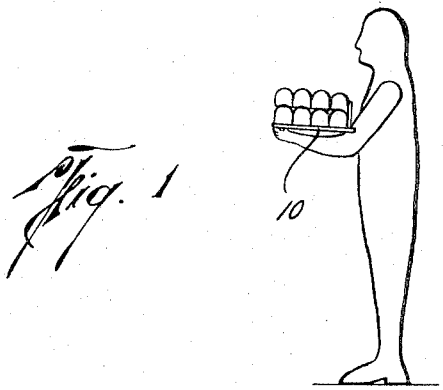
Figure 2:
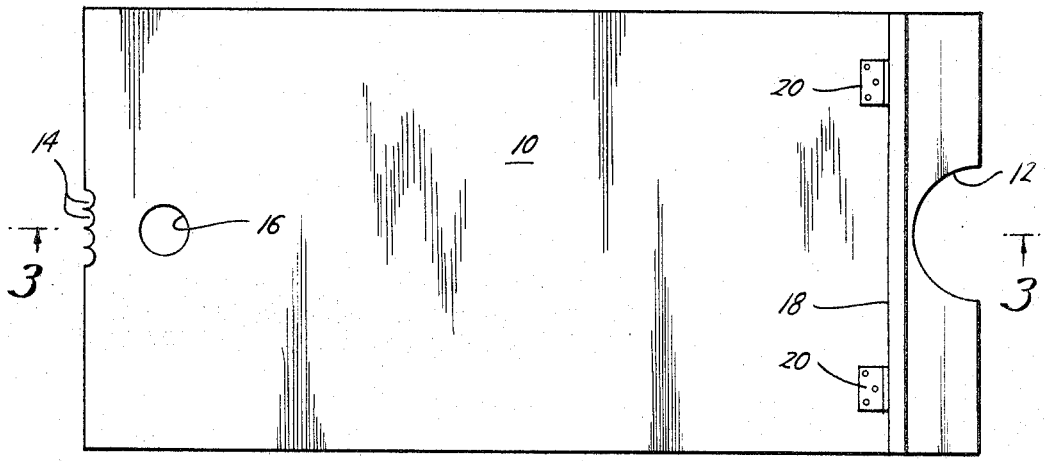
FIGURE 2 is a plan view of a preferred embodiment of this invention.

In the embodiment shown in the drawing, the carrying board of this invention comprises a substantially rectilinear rigid board element 10 preferably having a width approximately equal to the length of the usual loaf of sliced bread, and a length sufficient to support 4 loaves of bread lying side by side. In one end of the board 10 a recess 12 is formed, the recess being shaped so as to relatively closely engage a person's upper arm and to resist lateral movement of the board with respect to the arm of a person carrying the board when the recess is engaged on the arm. The recess may, for example, be generally arcuate, and subtend an arc of something less than 180°. In the other end of the board finger grasping means are provided, such means comprising a plurality of finger grooves 14 extending across the edge of this end of the board, substantially centrally located with respect to the width of the board. Four grooves are shown, although two or three grooves may be found to be sufficient in some cases. Adjacent this end of the board a thumb hole 16 is positioned at such a distance from the finger grooves 14 as to allow the thumb and fingers to fit into the hole 16 and grooves 14 in such a manner as to allow a person to grasp the end of the board.

Figure 3:
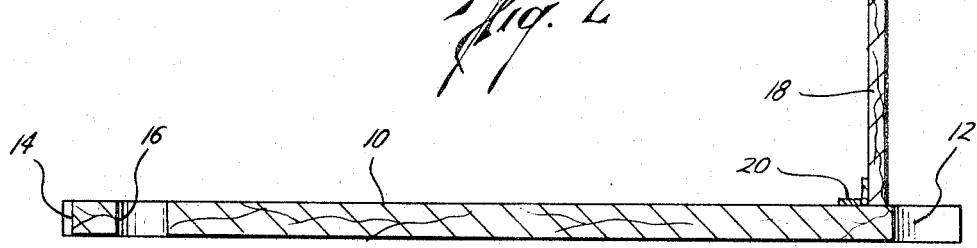
FIGURE 3 is a vertical sectional view of the embodiment shown in FIGURE 2, taken at line 3—3 of FIGURE 2.

Near the recessed end of the board an upstanding wall 18 traverses substantially the full width of the board. The height of the wall is preferably approximately the height of a loaf of bread, although it may be slightly higher or slightly less high than this. The wall is hingedly attached to the board by hinges 20 fastened to the wall and to the board in such a manner that the wall can be pivoted between a first position at right angles to the board, as shown in FIGURE 3 of the drawing, and a second position parallel to the board, i.e., lying flat on the board and extending toward the finger grasping means.

The board 10 and wall 18 are preferably made of comparatively light weight material, but it is necessary that they be fairly rigid so as to provide support for loaves of bread or other soft deformable articles which may be carried thereon. One suitable material would be plywood about ¼ inch thick. In some instances a corrugated paperboard having a high strength would be usable. In such a case the board portion 10 is preferably made of two or more thicknesses of the paperboard. Various plastic materials, including foamed plastics such as polystyrene foam, are also satisfactory for the purposes of this invention.

Although an ordinary hinge 20 is shown in the drawing, various hinge means may well be applied to allow the wall 18 to be folded forward. The folding of the wall 18 is principally for the purpose of allowing ease in handling and storing of the carrying board of this invention. It is of course necessary that the wall 18 not be allowed to fold toward the recessed end of the board because it is necessary for this wall to support the bread on the board.

It will be seen that when a carrying board of this invention is used to carry bread or other readily deformable articles, the articles will be supported throughout substantially their full length so that the weight of the article does not cause deformation. In the case of bread the weight of the loaf of bread would, if carried across a bare arm, cause the ends of the loaves to sag and the center of the loaves to be mashed out of shape and therefore greatly decrease the salability of the bread. With the present invention, however, the bread route salesman could carry a large number of loaves at one time without any danger of causing distortion or mashing of any of the bread.

Although a preferred embodiment of the invention has been shown and described herein the invention is limited only as set forth by the following claim.

What is claimed is:
A carrying board comprising:
a rigid board having
a recess in one end in which the arm of a person carrying the board may be engaged with the board to hold the board against lateral movement relative to the arm,
finger grasping means on the other end of the board comprising a plurality of finger grooves in the other end of the board and a thumb hole through the board adjacent said finger grooves and
an upstanding wall traversing said board adjacent said one end.

References Cited by the Examiner

UNITED STATES PATENTS

| 857,050 | 6/1907 | Gottschalk | 224—45 |
| 1,003,107 | 9/1911 | Heyman | 224—48 |
| 1,953,933 | 4/1934 | Gundelach | 224—48 |
| 2,994,463 | 8/1961 | Drader | 224—48 |

FOREIGN PATENTS

| 248,226 | 3/1926 | Great Britain. |

GERALD M. FORLENZA, Primary Examiner.
J. E. OLDS, Assistant Examiner.